United States Patent
Bacon et al.

[19]

[11] Patent Number: 6,041,179
[45] Date of Patent: Mar. 21, 2000

[54] OBJECT ORIENTED DISPATCH OPTIMIZATION

[75] Inventors: David Francis Bacon, New York; Mark N. Wegman; Frank Kenneth Zadeck, both of Ossining, all of N.Y.

[73] Assignee: International Business Machines Corporation, Armonk, N.Y.

[21] Appl. No.: 08/723,058

[22] Filed: Oct. 3, 1996

[51] Int. Cl.[7] .................................................. G06F 13/00
[52] U.S. Cl. ............................................................ 395/709
[58] Field of Search .................................. 395/703, 702, 395/700, 685, 683, 650, 707, 709

[56] References Cited

U.S. PATENT DOCUMENTS

| | | | |
|---|---|---|---|
| 5,450,583 | 9/1995 | Inada | 395/650 |
| 5,499,371 | 3/1996 | Henninger et al. | 395/700 |
| 5,579,518 | 11/1996 | Yasumatsu | 395/705 |
| 5,600,838 | 2/1997 | Guillen et al. | 395/683 |
| 5,659,751 | 8/1997 | Heninger | 395/685 |
| 5,675,801 | 10/1997 | Lindsey | 395/702 |

OTHER PUBLICATIONS

Amitabh Srivastava, "Unreachable Procedures in Object–Oriented Programming", ACM Letters on Programming Languages and Systems, vol. 1, No. 4, Dec., 1992, pp. 355–364.

Brad Caler & Dirk Grunwald, "Reducing Indirect Function Call Overhead In C++ Programming", ACM Principles and Practice of Programming Languages, Portland, Oregon, 1994.

*Primary Examiner*—Emanuel Todd Voeltz
*Assistant Examiner*—Matthew Smithers
*Attorney, Agent, or Firm*—Whitham, Curtis & Whitham; Louis J. Percello

[57] ABSTRACT

An object oriented dispatch optimization method determines statically which body of code will be executed when a method is dispatched. The program code is examined to identify all procedure bodies that can be invoked for a given class and a given method. An identified procedure body is analyzed to determine whether a method invocation on a pointer can invoke only one procedure body. Based on this analysis, either the procedure body or the invocation mechanism is changed so a unique procedure is directly called without a test or dispatch being used.

2 Claims, 5 Drawing Sheets

OBJECT ORIENTED DISPATCH OPTIMIZATION

BACKGROUND OF THE INVENTION

1. Field of the Invention

The present invention generally relates to dispatch optimization in an object oriented environment and, more particularly, to a method for determining statically which body of code will be executed when a method is dispatched.

2. Background Description

Object oriented programming (OOP) is the preferred environment for building user-friendly, intelligent computer software. Key elements of OOP are data encapsulation, inheritance of attributes and polymorphism (i.e., overloading of operator names). While these three key elements are common to OOP languages, most OOP languages implement the three key elements differently.

In a conventional programming language, such as C or Pascal, procedures and functions are written to manipulate data and obtain solutions. In contrast, object oriented programming allows the programmer to view concepts as a variety of units or objects in a hierarchy, without worrying about the data type, repeated variable names, or function names. This allows the programmer to concentrate on the program design, rather than programming rules. The programmer can represent relationships among components, objects, tasks to be performed, and conditions to be met in a way that allows the reuse of code components and reduces the bulkiness of code and the time and effort needed to develop programs.

Examples of OOP languages are Smalltalk, Object Pascal, Java, and C++, all of which are well known in the art of computer languages, compilers, and applications programming. Of these, Smalltalk may be characterized as a programming environment instead of merely a language. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data. Instead, the programmer need only be concerned with using the right message. Object Pascal, another OOP, was created by developers from Apple Computer, some of whom were involved in the development of Smalltalk at PARC, in conjunction with Niklaus Wirth, the designer of Pascal. C++ was developed by Bjarne Stroustrup at the AT&T Bell Laboratories in 1983 as an extension of C. C++ modules are compatible with C modules and can be linked freely so that existing C libraries may be used with C++ programs.

The key concept of all OOP is the class, which is a user-defined type. Classes provide object oriented programming features. Further information on object oriented programming concepts may be obtained by referring to one of several standard text books, such as *Object Oriented Design with Applications* by Grady Booch, The Benjamin/Cummings Publishing Co., Inc. (1991).

To focus this description on the instant invention, and minimize unnecessary discussion of background information known to persons skilled in the art, descriptive terms will be used where appropriate which, except where noted or where clear from the context, are familiar terms known to ones of ordinary skill in OOP. More particularly, as used herein, a class is a definition of a type of object, describing its methods and the kinds of data that can be placed in the object. During execution of the program various objects are created. When an object is created based on a class, that is called an instance of that class and the names of the individual pieces of data are called instance variables.

The procedures that can be invoked on the data in an instance of a class are the methods of that class. The class definition therefore contains descriptions of both the instance variables and the methods.

Further, a class such as, for example, foo, can be defined in terms of another class such as, for example, bar, by declaring that foo is like bar except that it may contain additional instance variables, additional methods, or that some of the methods have a different definition. In this way the definition of foo can be much shorter than bar's. In this case, foo is said to inherit from bar. Foo is said to be a derived class of bar. Moreover, bar is said to be a base class of foo. If baz is a derived class of foo, then baz is also a base class of bar, which is to say the derived class (and base class) relations are transitive.

A class and its derived class may contain different definitions for an identically named method. For example, foo and bar may both have a method called, for example, addsub, and both have an instance variable named, for example, I, but when addsub is invoked on an instance of foo, I is increased by one, and when it is invoked on an instance of bar, I is decreased by one. The method body, also known as function body, for addsub when the instance is of type foo is the method body which increases I, and the method body for addsub when the instance is of type bar is that which decreases I by one.

It is, in general, not possible to determine (either by compilers or by humans) when looking at a program which invokes a method on an instance what class that instance will be. The reason is that, as the program proceeds, the same code can be applied to instances of many different classes. Therefore, at the time the program is executing the code must determine the class of an instance and invoke the appropriate function body. This process of determining the class of an instance and invoking the appropriate function body is called method dispatch. Method dispatch consists of using both information about the class of the instance and the name of the method to determine which code should be executed next.

In Smalltalk, all method dispatches are made dynamically. In other words, the actual method body that will be invoked at a particular method invocation site is determined by a combination of the class of the object and the name of the method. This may be done by following a pointer from the object to its class, and then looking up the method in the classes' method table. In contrast, C++ allows the programmer to decide whether a particular method should be dispatched statically or dynamically. Methods that are dispatched dynamically are called "virtual methods." The present invention is concerned only with virtual method invocations and, therefore, methods that are dispatched statically will not be described. Accordingly, when the following description references C++ programs, the terms "method dispatch" or "method invocation," unless otherwise qualified, shall mean "virtual method dispatch" or "virtual method invocation." Note that in the C++ literature, a virtual method dispatch is also referred to as a "virtual function call."

Method dispatches are a major source of complexity when trying to optimize the programs. More particularly, there is a direct cost associated with method dispatches in the form of the extra instructions required for the dynamic dispatch, including extra memory operations, and pipeline penalties caused by branching to an unknown address. For C++ programs, these costs have been estimated as ranging from 0% of the total run time, for programs that make no significant use of method dispatch, to 6%, for programs that make moderate use of method dispatch, to 27%, for programs that make extensive use of method dispatch.

There is also an indirect cost relating to inlining" which, in many cases, may be even more significant. As is known in the art, inlining is the process whereby a procedure call is replaced with a copy of the body of the called procedure. Inlining is much more important in object oriented languages than in non-object oriented languages, such as C or Fortran, because object oriented languages encourage smaller, more modularized functions, and often have a linguistic mechanism to support inlining. Studies have shown that C++ functions do in fact have significantly smaller static and dynamic instruction counts than C programs. However, when a method dispatch is dynamic, inlining cannot be performed.

Another cost associated with method dispatch is compilation speed and compiled code size. The compiled code size is increased, and hence the compilation speed is decreased because, without any information about the potential targets of a method dispatch, all the possible methods must be linked into the program. This slows down linkage and causes unused methods to bloat the object file.

There are methods in the relevant art directed to reducing, at least partially, the above-identified problems relating to inlining and compilation speed and compiled code size, but each has limitations in performance, or requires so large of a processing time as to be impracticable.

One of these methods, which will be referred to as the Resolution by Unique Name method, is described by Brad Calder and Dirk Grunwald (hereinafter referenced as "Calder and Grunwald") in their article entitled "Reducing Indirect Function Call Overhead in C++ Programs," *Conference Record of the 21st ACM Symposium on Principles of Programming Languages,* Portland, Oreg., January 1994, pp. 397–408. In the referenced article, Calder and Grunwald observed that in C++ if there is only one method body defined for a given method signature in the entire program, then all dispatches for that method must be to that one method body. The method signature or function signature in a typed language like C++, Java, or Modula-3 is its name and the number and types of its arguments; for untyped languages like Smalltalk it is just the name and the number of arguments.

It can be seen that if one can determine that for all dispatches from a particular point in the program a particular method body must be invoked, then that dispatch can be replaced by a direct call to the appropriate body of code without modifying the end result of the program, and hence this replacement can safely be done automatically. Calder and Grunwald have published some preliminary measurements stating that, in their selected set of particular benchmark programs, it is possible with the Resolution by Unique Name Method to replace approximately one third of the method dispatches by a direct call.

Calder and Grunwald's Resolution by Unique Name Method can be summarized as being an algorithm for determining when a method dispatch can go only to a single method body, which consists of the steps of:

examining the entire program;

determining which methods have only one method body associated with that method signature;

examining a method dispatch; and determining whether that method is one of the methods previously determined to have only one function and, if so, converting the dispatch to a direct call.

There is at least one problem with the Resolution by Unique Name Method, though, which is that the replacement of a dispatch by a direct call cannot be done by a traditional compiler. The major reason is that a compiler is usually not given an entire program at a time, but only a piece of the program. The entire program is composed by a program called a linker. Hence, the Resolution by Unique Name Method is generally referred to as a link-time optimization. It is possible for Calder and Grunwald's method to be performed at other times, if it is given appropriate information. For example, if a database of information about an entire program is built first, then when a compiler is used to compile a piece of a program, it can refer to information in the built database about the rest of the program. However, if the rest of the program changes, and the information which was relied upon changes, the program may have to be recompiled using the new information.

Another related method directed to resolving virtual function dispatch is called class hierarchy analysis (henceforth "CHA"), and is described by Dean, Grove and Chambers in "Optimization of Object-Oriented Programs Using Static Class Hierarchy Analysis", in the *Proceedings of the Ninth European Conference on Object-Oriented Programming,* Springer-Verlag, 1995. CHA uses the type information supplied only in statically typed languages, therefore, is not applicable to a dynamically-typed OOP languages such as Smalltalk.

The meaning of statically-typed, which relates to OOP languages such as C++ is as follows: When a virtual function call is made in C++, it is dispatched through a pointer or a reference to an object, and that pointer has a particular type. The type is either specified explicitly, i.e., statically, by the programmer, or is statically derivable by the compiler from other type information, as shown in the example below:

```
class A {public: virtual void bar();};
class B: public A {public: void bar();
A* top;};
class C: public B {public: virtual void glorp();
};
void example (B* p) {
p → bar(); // Call via explicit type "B"
p → top → bar(); // Call via implicit type "A"
}
```

In either case, the compiler has statically obtainable information about the declared type of the pointer through which the dispatch is being made. The rules of the language (common to C++, Java, and Modula-3) state that a pointer whose static type is "B" can point to objects of type "B" or any of its derived types (but not its base types).

Thus, if A is a base class from which B derives, and C in turn derives from B, then a pointer "p" of static type "B" can actually point to objects of types "B" or "C" at runtime, but not objects of type "A".

CHA resolves a virtual function dispatch by computing this set of possible dynamic types, and then determining the virtual function that would be invoked for each of those types. In the example above, the call "p->foo( )" is through a pointer of static type "B", whose possible dynamic types are "B" and "C". For dynamic type "B", the function invoked would be B::foo( ); for dynamic type "C" the function invoked would also be B::foo( ), since "C" does not override foo and therefore inherits its definition from "B". Since there is only one possible target function for all of the possible dynamic types that "p" can point to, the call can be resolved to "p->B::foo( )".

In the second example, the pointer "p->top" is to an object of static type "A", so the possible dynamic types are "A", "B", and "C". If "p->top" points to an object of type "B" or "C", the virtual function B::foo( ) will be invoked, as we just described. However, if "p->top" points to an object of type "A", then A::foo( ) will be invoked because "A" defines its own version of the "foo" function. Since there is more than one possible target function, the call cannot be resolved by CHA.

It can be seen by one of ordinary skill that the set of virtual call sites resolved by CHA is a superset of the call sites resolved by Calder and Grunwald's Unique Name method. This is because CHA starts by using the signature of the function and then uses the static type information to identify additional virtual call sites.

However, since CHA relies on knowing the set of classes derived from a particular static class type, it requires knowledge of the complete class hierarchy. Therefore, like the Resolution by Unique Name Method, CHA can either be performed at link-time or at an earlier phase, provided that a program database is available which specifies the complete class hierarchy.

Still another method known in the art for removing dead code is referred to as "alias analysis." A description of alias analysis can be found in several publications, including K. Cooper et al., "Fast Interprocedural Alias Analysis", Conference Record of the Sixteenth ACM Symposium on Principles of Programing, ACMPRESS, January 1989, pp. 49–59. Basically, alias analysis processes a program in a manner that keeps track of every variable identified during compilation, and keeps track of what each variable could possibly point to, and iterates repeatedly over each function call to determine, rigorously, if the call will occur during running of the program. Depending on which particular alias analysis algorithm is used, and which language it is applied to, and other program-specific parameters, this method often requires, in typical cases approximately fifty to one thousand iterative inspections of the entire program and of each function call. Accordingly, alias analysis can be impracticable for many applications.

SUMMARY OF THE INVENTION

It is an object of the present invention to provide a method for determining statically which body of code will be executed when a method is dispatched.

It is another object of the invention to provide a very fast, simple type-inference process for object oriented programs.

As will be seen from the description below, the present invention, which will be called the Rapid Type Analysis, (or "RTA"), converts many cases of method dispatches to direct calls which would not have been converted by the class hierarchy analysis (CHA). Further, the present invention can potentially reduce the set of possible method bodies that can be invoked at a method dispatch site. The RTA method accomplishes this function by inspecting each function call only once, instead of the repeated inspections required by alias analysis.

More particularly, the present invention provides a process for increasing the execution speed of programs which comprises the steps of examining a program to identify all procedure bodies that can be invoked for a given class and a given method, analyzing a procedure body to determine whether a method invocation on a pointer can invoke only one procedure body, and changing either the procedure body or the invocation mechanism so that a unique procedure is directly called without a test or dispatch being used.

Further, the present invention provides a method to determine that certain code in the object oriented program will never be executed. Since unexecuted code does not need to be compiled or linked into the final program, reducing both compilation time and the size of the compiled program.

There are two basic detections used within the present invention to establish that code cannot be executed, which are summarized below. Although these detections are summarized in the language of flow analysis, in a conservative manner, the preferred implementation will be an optimistic one. For informational purposes, a complete technical definition of "optimistic" can be found in, for example, *Constant Propagation with Conditional Branches,* by Mark Wegman and Frank Kenneth Zadeck, ACM Transactions on Programming Languages and Systems, volume 13 number 2, April 1991.

The first detection identifies methods for which there for no dispatches. This detection is exploitable because if there are no dispatches of a given method then that method contains only dead code and therefore can be eliminated. When all such code bodies have been eliminated, there may be remaining methods which were only invoked from code bodies now known to be dead code. Therefore, this first detection can be iterated. It should be noted that "iteration" as used here distinguishes from "iteration" as used in alias analysis, the latter referring to repeated inspection of the same functions or methods.

If using a conservative analysis the present method assumes at its start that all procedure bodies are dead, with the exception of those procedures specially defined by the language to be invoked automatically when the program is run. For example, for C++ these automatically invoked procedures would be the procedure named "main" and the constructor methods of any objects defined in the outer, "global", scope. These specially designated procedures are considered to be live. It should be noted that a procedure is live if it cannot be determined, with certainty, that it will not be called. In other words, a procedure is live if, with some particular set of inputs, it may be executed when the program is run.

Code directly invoked from live code is flagged as live. This process is iterated until there is no more live code discovered. All other code is now known to be dead and can be safely eliminated. As will be described, "optimistic" analysis can obtain a better result. This can be seen by considering a routine that invokes itself but is not invoked from anywhere else. The optimistic analysis will correctly determine that the code is, in fact, dead, whereas the more conservative analysis will not.

The second detection identifies classes and derived classes for which there are no allocations of objects. It is then known that all methods defined for that class cannot be invoked. Subsequently it is known that certain code, i.e., the code relating to these methods, is dead. Next, since it is then known that the only allocations for certain classes are within that dead code, this second detection can be iterated. The present inventive method combines these two detection mechanisms for discovering dead code. As will be described, the present invention preferably employs techniques of optimistic analysis to obtain a stronger result. Further, in a preferred implementation, the program code is examined to identify all method bodies that can be invoked for a given class and a given method. An identified procedure body is analyzed to determine whether a method invocation on a pointer can invoke only one method body. Based on this analysis, either the method body or the invocation mechanism is changed so that a unique method is directly called without a test or dispatch being used. More specifically, rather than using the alias analysis method of trying to identify the possible types at each virtual function call site, the methods implemented in this invention are directed to identifying the set of possible types that can be created by a program. This greatly simplifies the task. Because of the design and usage conventions of C++ classes, the process is almost as precise as more complex alias analysis methods that attempt to track the possible type of each individual variable. The result is a reduced processing time, which can be as much as fifty to one thousand times, depending on the particular code. Further, the present method is also easily adapted to allow separate compilation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention applies to all OOP languages that provide dynamic method dispatch, including C++, Smalltalk, etc.

The invention assumes that the class created by a NEW operation is known. In C++, this is always so because the new operation can only be performed with a type name, which is static. In languages such as Smalltalk, the NEW operation can take a type variable, so the class or classes created must be determined by analysis. To apply this invention to Smalltalk, it must be supplemented with a procedure for determining the set of classes that can be created by each NEW operation.

Figure 1:
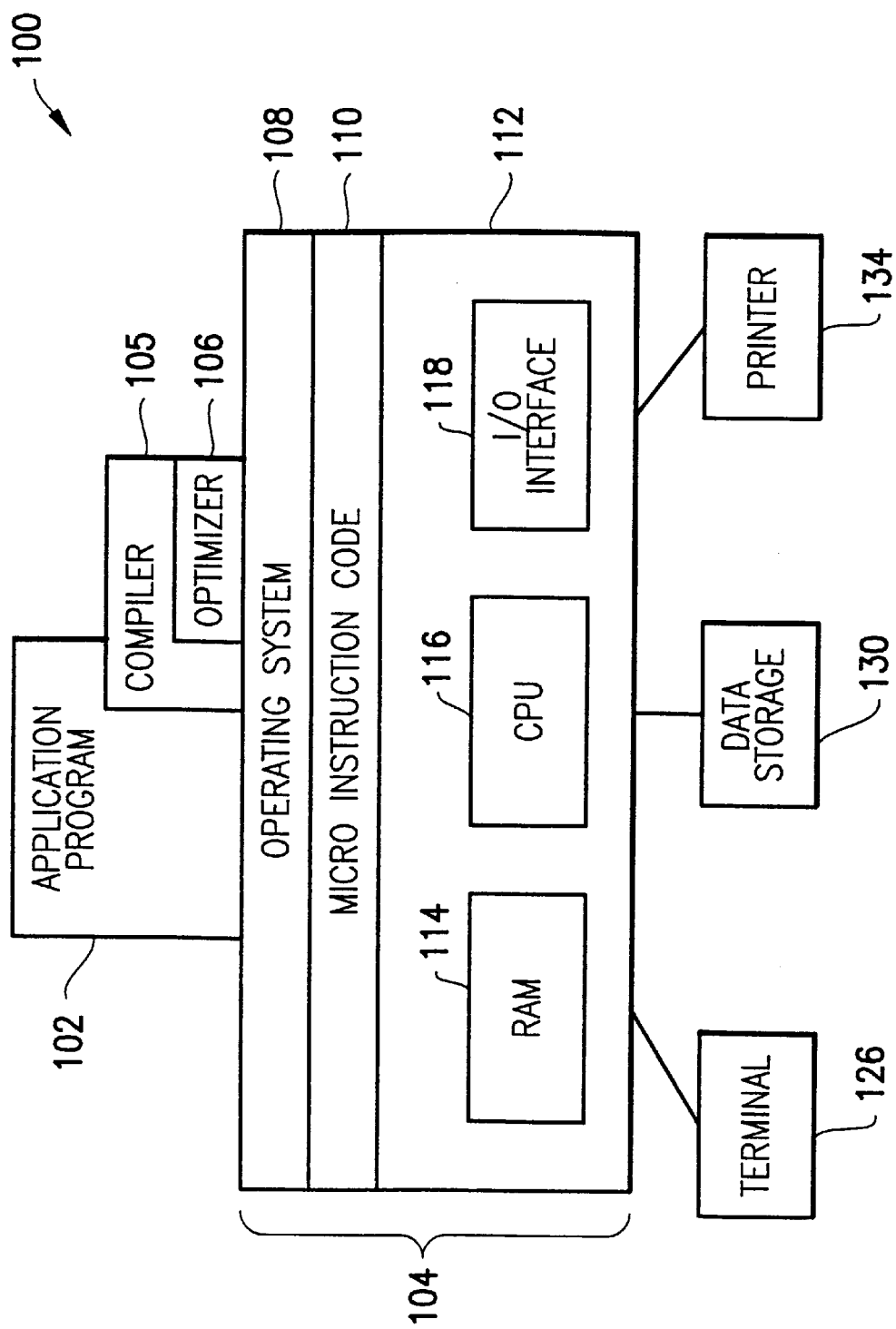
FIG. 1 is a block diagram showing a computer system on which the object oriented dispatch optimization procedure according to the invention may be implemented.

Referring now to the drawings, and more particularly to FIG. 1, there is shown a block diagram showing a computer system 100 on which a preferred embodiment of the present invention operates. The preferred embodiment includes one or more application programs 102. One type of application program 102 is a compiler 105 which includes an optimizer 106. The compiler 105 and optimizer 106 are configured to transform a source (like an application program 102) program into optimized executable code. More generally, the source program is transformed to an optimized form and then into executable code. A more detailed description of basic concepts of compilers is found in Alfred V. Aho, Ravi Sethi and Jeffrey D. Ullman, *Compilers: Principles, Techniques, and Tools,* published by Addison-Wesley Publishing Co. (1986).

The compiler 105 and optimizer 106 operate on a computer platform 104 that includes a hardware unit 112. The hardware unit 112 includes one or more central processing units (CPU) 116, a random access memory (RAM) 114, and an input/output interface 118. Micro-instruction code 110, for instance a reduced instruction set, may also be included on the platform 104. Various peripheral components may be connected to the computer platform 104 including a terminal 126, a data storage device 130, and a printing device 134. An operating system 108 coordinates the operation of the various components or the computer system 100. An example of computer system 100 as described above is the IBM RISC System/6000 (RISC System/6000 is a trademark of the IBM Corporation.) It is readily understood that those skilled in the computer arts will be familiar with many equivalent computer systems 100.

FIGS. 2a–2d is a flow diagram of the invention. It shows a procedure for calculating the set of potentially live procedures P, and the set of potentially instantiable classes C. This information can subsequently be used for function call de-virtualization, code compaction, programming environments, etc. as described in the subsequent section.

The process depicted in FIGS. 2a–2d applies to OOP languages in general, both statically typed languages like C++ and Java, and dynamically typed languages like Smalltalk. Steps that are dependent on the language semantics are represented as double boxes. Single boxes represent steps that apply uniformly to all OOP languages.

The process is described using the notation of set theory in order to simplify and clarify the presentation. For increased operating efficiency, the preferred embodiment uses lists, trees, and hash tables to represent these sets. Further, iteration of steps is presented in terms of creating a set and then subsequently removing its elements. For efficiency in operation the preferred embodiment will implement this as iteration over lists or as marking and unmarking of set elements. A generic operation of the process according to the present invention will now be described:

The process begins by initializing its data sets. More particularly, the set of live procedures P is initialized in a language-dependent manner (300). For C++, P is initialized to main( ) and the constructor methods of all global scope objects. The set of unexamined live procedures U is set equal to P (301).

The set of live classes C (those that may be instantiated by the program under analysis) is initialized in a language-dependent manner to be those classes which must of necessity be created (or are already created) when the program is started (302). For C++, this is the set of classes that are created as objects in the global scope.

The set of virtual function invocations I is also initialized to be empty (303). The set I records, in a language-dependent manner, the kinds of virtual function calls that have been made by procedures that have been determined to be live by the process. Each member of the set I is a pair of <function-name, type-information>. For Smalltalk, the type information is simply the arity (number of arguments) of the function called. For C++ and Java, the type information is the declared static type of the pointer or reference through which the virtual call was made, and the types of the arguments of the function.

The process then commences its outer iteration over the unexamined procedures in U (304). If there are no unexamined procedures remaining, the process terminates. Otherwise, a procedure p is removed from U (305).

The set Cp of classes created by procedure p is computed in a language dependent manner (306). For statically typed languages, this information is easily available through a simple static analysis of the procedure body, since when a new class object is created the class type must be specified directly. For dynamically typed languages like Smalltalk, calculating Cp is more complex because the argument to the NEW operation may be a type variable, not just a type constant. For Smalltalk, Cp can either be the set of classes referred to in the procedure body, or else a pre-analysis will have to take place which calculates the set of possible types that could be created.

Figure 2A:
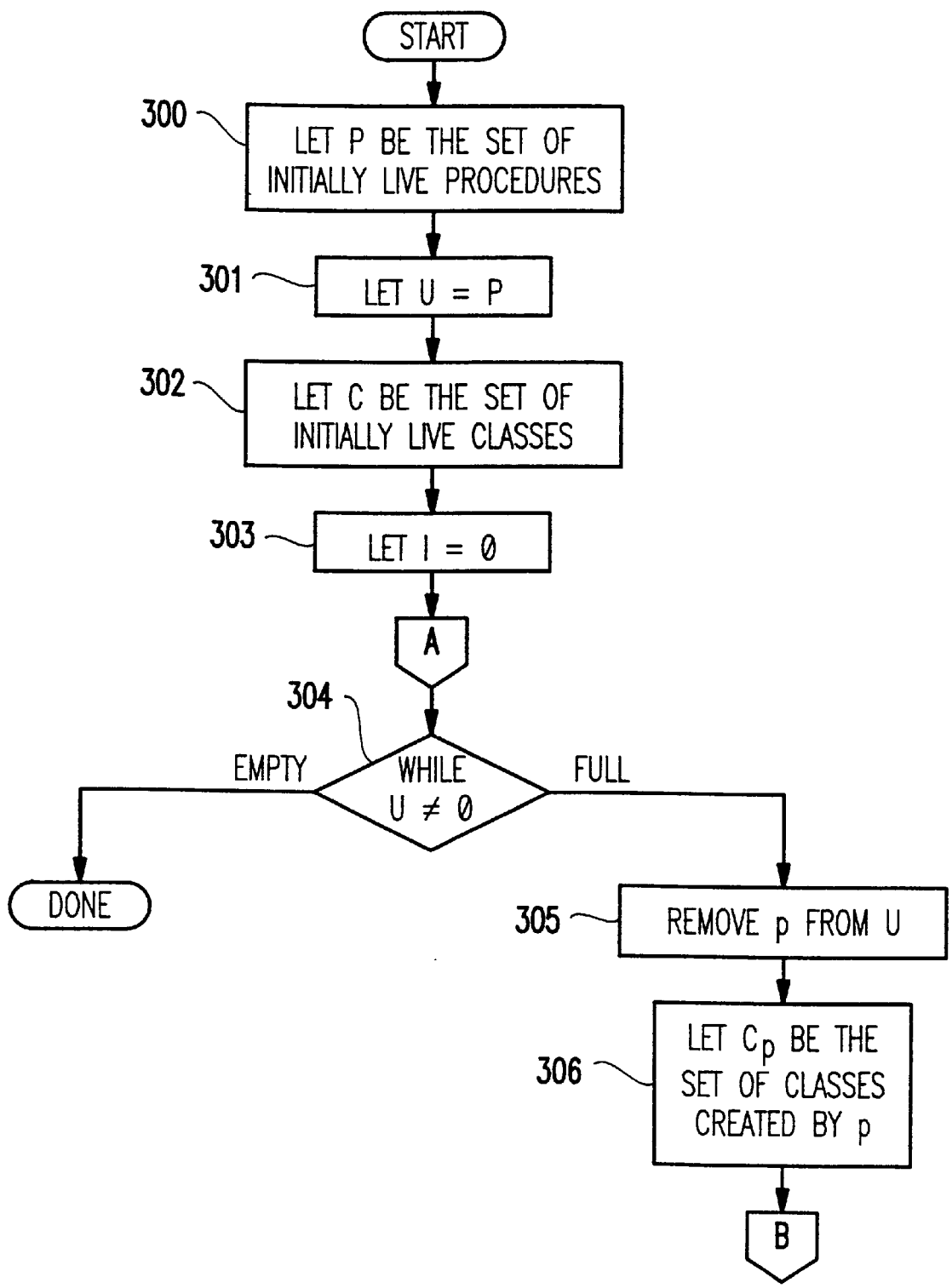
FIGS. 2a, 2b, 2c, and 2d constitute a flow diagram illustrating the logic of the present method.
Figure 2B:
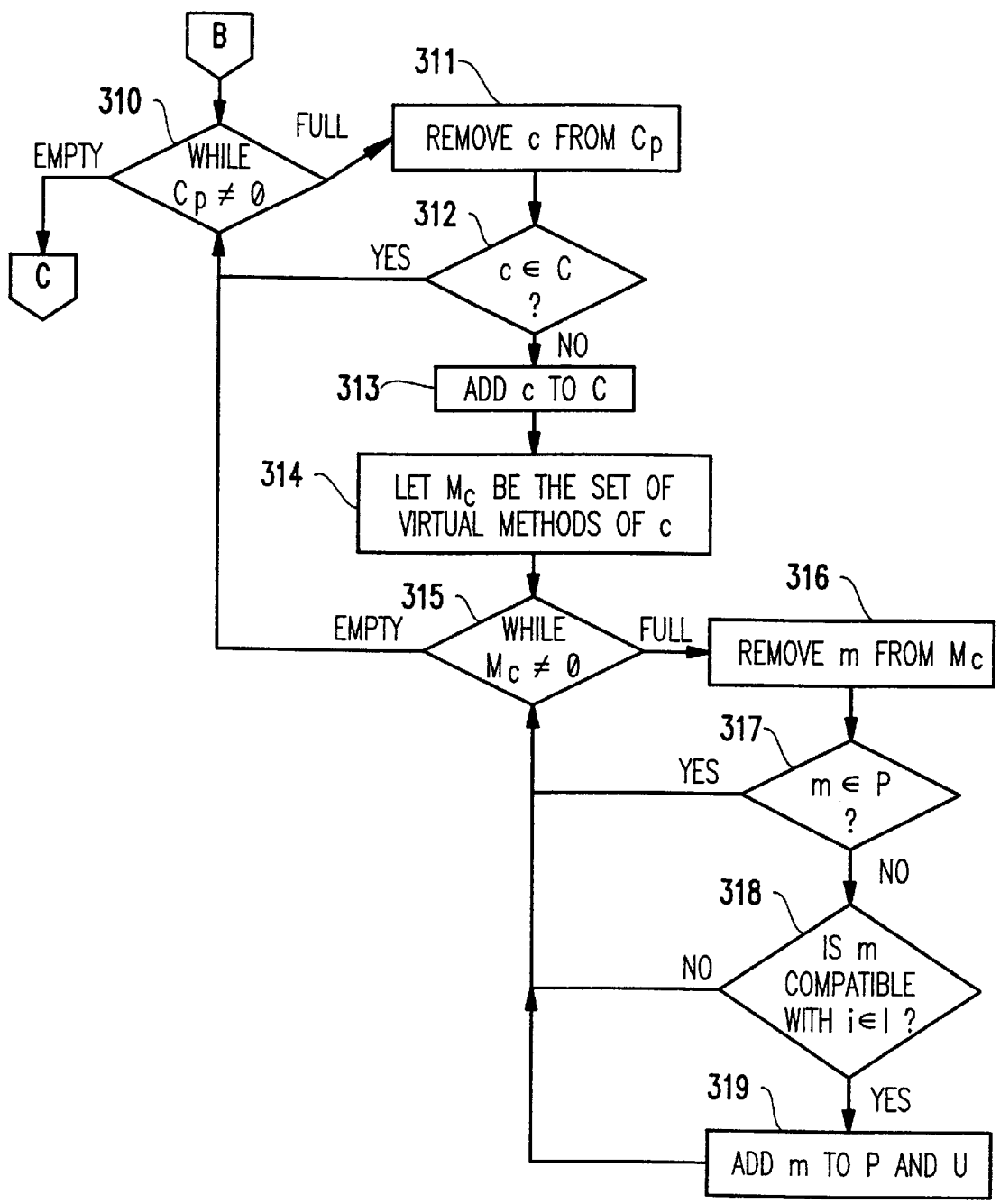

Once the set of created classes Cp has been computed, the process continues in FIG. 2(b) at B, and iterates over the elements of Cp (310). If Cp is empty, the process continues at C, in FIG. 3(c). If Cp is not empty, a class c is removed from Cp (311).

If c is already in C, the set of live classes, then it has already been instantiated by another procedure that was previously examined, and the algorithm goes back for the next class (312). Otherwise, c is a newly discovered live class and is added to the set C of live classes (313). Mc is computed to be the set of virtual methods of class c; for Smalltalk and other pure OOP languages, all methods are virtual so Mc will be the set of all methods of c (314).

The process then iterates over the methods in Mc (315). When all methods have been examined, control returns to 310 and the next class created by the current procedure p is considered. If there are methods remaining in Mc, the next method m is removed (316). If m has already been discovered to be a live procedure (in the set P), then the next method is considered (317).

Otherwise, a language-dependent test is performed as to whether the method m is compatible with any of the live virtual call invocations in I (318). For Smalltalk, this test simply involves determining whether there is an element <function-name,arity> contained in I, where function-name is the name of m and arity is the number of its arguments. For C++ and Java, the test is more complex: is there a member of I with the same name and argument types as m, whose statically declared type is either c (the class type of method m) or a derived class of c? If this test fails, then there is no method invocation in the live procedures P which is compatible with m, so control returns to 314 and the next method of c is examined. If the test succeeds, then m is a new live method, and is added to both P and U (319); control then returns to 315 and the next method of c is examined.

Figure 2C:
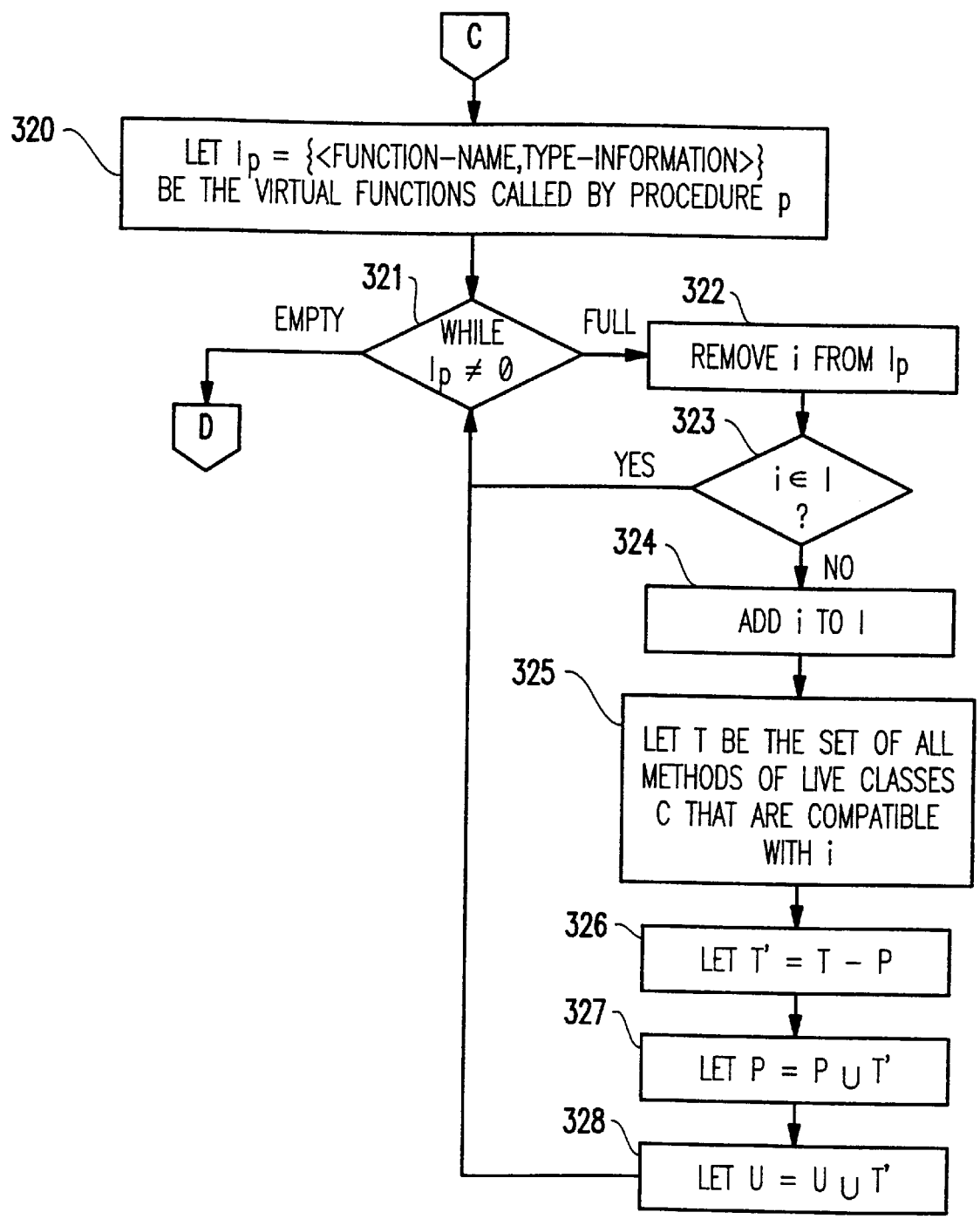

When all the classes Cp instantiated by procedure p have been examined (310) control passes to C in FIG. 2(c). This is the second phase of the algorithm, which handles the virtual call sites in procedure p. The first phase, shown in FIG. 2(b), handled the new classes created by procedure p.

The set Ip is computed, in a language-dependent manner, to be the virtual functions invocations of the procedure p (320). The invocations are represented in the same way as in the set I, namely as a pair <function-name, type-information>, where type-information is language-dependent.

The process then iterates over the virtual function invocations Ip (321). When there are no more invocations to process, control passes to the final phase of the process, labeled D on FIG. 2(d), which is described further below. While there are invocations remaining to process, an invocation I is removed from IP (322). If an invocation identical to I has already been added to I (323), then control returns to 321 and the next invocation is considered. Otherwise, I is added to I (324).

The set T is computed, in a language-dependent manner, to be all of the methods of live classes (classes in C) that are compatible with I (325). A method is compatible with a call site instance I if a dynamic dispatch at I could potentially be a call to that method. For Smalltalk, the compatibility computation is simple: it is the set of methods of the classes C that have the same name and arity as the invocation described by I. For C++ and Java, it is the set of methods of the classes C that have the same name, arity, and argument types as I, and whose class is either the same as the static class type of i, or is a derived class of the static class type of I.

The set T' is then computed to be the set T without those methods already in P, the set of live procedures (326). The methods in T' are added to P (327) and U, the set of unexamined live procedures (328).

Figure 2D:
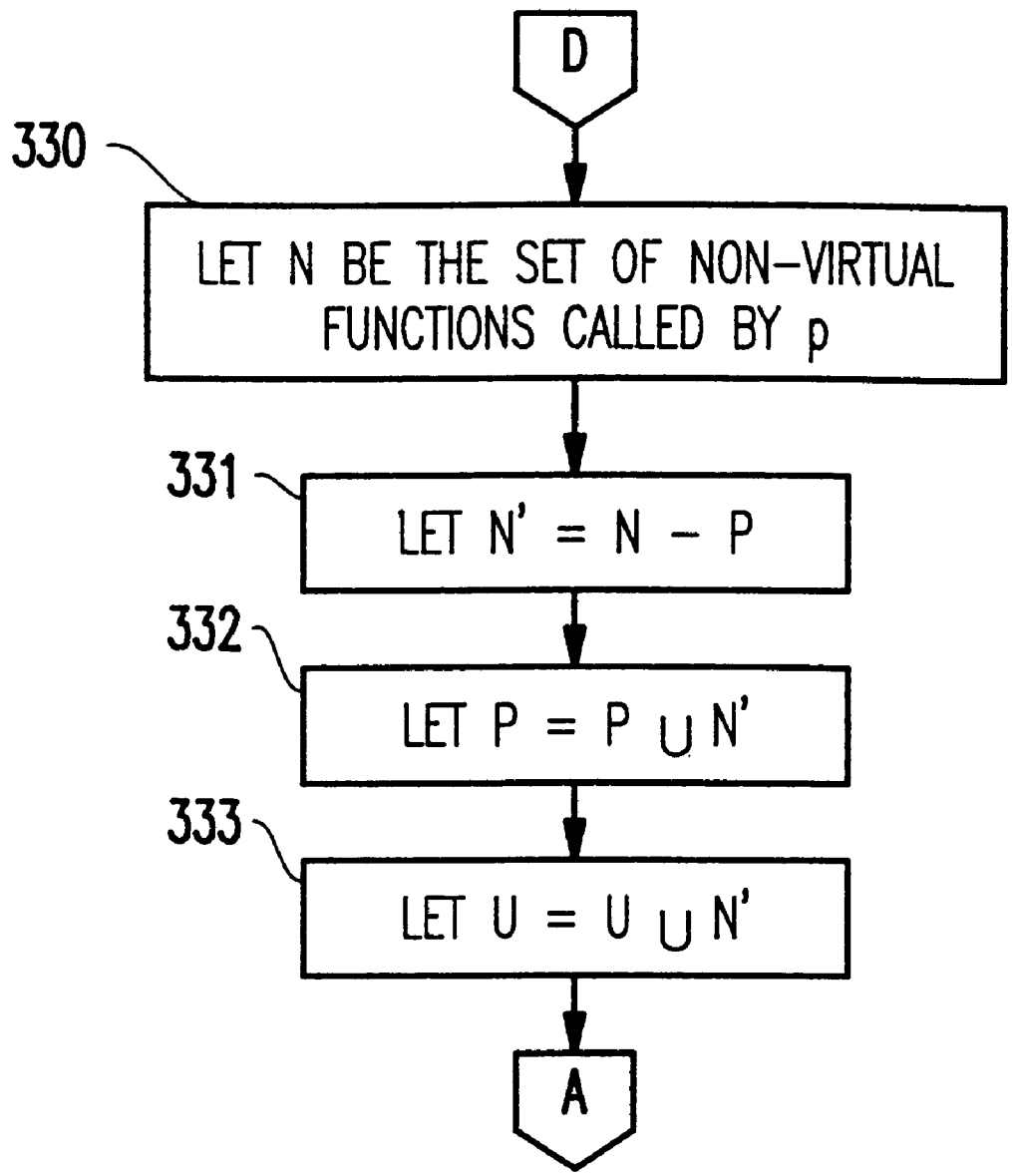

As stated above, when all of the virtual method invocations Ip by procedure p have been considered, control passes to D, shown in FIG. 2(d). The set N is computed to be the non-virtual functions called by p (330). In a pure OOP language like Smalltalk, this set is always empty, and the steps in FIG. 2(d) can be omitted.

The set N' is computed to be the set N without those procedures already in P, the set of live procedures (331). The procedures in N' are then added to P (332) and U (333).

Finally, control returns to A in FIG. 2(a). The processing of procedure p is complete, and a new unexamined live procedure from the set U is processed, or else the process terminates.

PARTICULAR IMPLEMENTATION EXAMPLES

The invention has been described in as generic a manner as possible, to enable one of skill in the computer arts to readily tailor it and implement it on various particular languages. In furtherance of that objective the invention has been described using the mathematical notation of set theory. A practitioner skilled in the arts will recognize that these sets can be efficiently implemented using lists, hash tables, and similar standard data structures.

In an example implementation, the invention is implemented within a compiler for the C++ language. The compiler builds a call graph for the program, and the sets P and U are represented implicitly by boolean variables attached to each procedure object. Similarly, there is a graph which represents the class hierarchy, and the set C of live classes is represented implicitly by a boolean value attached to each class object. The set I of call instances is represented by a hash table which is indexed by function signature.

The set Cp of classes instantiated by a procedure p is represented by a list associated with the procedure object. This list is pre-computed in an earlier phase of compilation. Instead of removing elements from the set Cp, our implementation simply traverses this linked list.

Similarly, the set Mc of virtual methods of class c is pre-computed by the compiler as part of its representation of the class hierarchy graph. The set Mc is represented by a hash table, and a standard iterator method is used to examine all of the members of set Mc.

The set Ip of virtual calls by procedure p is also pre-computed by an earlier compiler phase, and the iteration over this set is implemented by traversal of the linked list.

The set T of methods of live classes that are compatible with a virtual call instance i is computed by our example implementation by finding the signature of i with its associated class in the class hierarchy graph, and recursively looking up the same signature in all of the derived classes represented in the class hierarchy graph.

Using the Information Computed by the Present Method

The invention described thus far computes various sets of information regarding an object-oriented program. This information can be applied in a number of ways:

1. Resolution of Dynamic Dispatch. A virtual function call can be converted to a direct function call when there is only one method in P, the set of live procedures, that is compatible with the function name and type information of the called function. If there is more than one compatible function, but only a small number, the call can be resolved by introducing explicit tests for the reduced number of possible target functions.

2. Code Compaction. Code size can be reduced by only linking or including in the program image those procedures in P, the set of live procedures. All other procedures have been proven by the analysis performed by the algorithm to be dead, or impossible to execute.

3. Programming Environment. A programming environment can provide a view of the program in which only those procedures that are live (those in P) are displayed to the programmer, and only those procedures in P are listed or displayed as potential targets of virtual function calls. Classes not in C, the set of live classes, can also be elided. This elision of information will allow the programmer to concentrate on the functional parts of the program.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method for reducing an object oriented program, comprising the steps of:

identifying initial members of a set of live methods and procedures within said program, said initial members comprising methods and procedures that by definition in the program must be executed when the program is run;

identifying initial members of a set of live classes within said program, said initial members comprising classes that must be created when the program is run, based on said initial set of live methods and procedures;

identifying an additional set of live methods and procedures, comprising the additional methods and procedures reachable from the live methods and procedures within said set of live methods and procedures, and adding said additional set to said set of live methods and procedures;

identifying an additional set of live classes, comprising the additional classes potentially creatable by said identified set of additional live methods and procedures;

converting indirect methods invocations to direct method calls which do not perform a runtime type test or dynamic dispatch; and repeating said steps of identifying an additional set of live methods and procedures and of identifying an additional set of live classes until no further methods or procedures are added to said set of live methods and procedures.

2. A computer-implemented method for reducing an object oriented program, comprising the steps of:

identifying initial members of a set of live methods and procedures within said program, said initial members comprising methods and procedures that by definition in the program must be executed when the program is run;

identifying initial members of a set of live classes within said program, said initial members comprising classes that must be created when the program is run, based on said initial set of live methods and procedures;

identifying an additional set of live methods and procedures, comprising the additional methods and procedures reachable from the live methods and procedures within said set of live methods and procedures, and adding said additional set to said set of live methods and procedures;

identifying an additional set of live classes, comprising the additional classes potentially creatable by said identified set of additional live methods and procedures;

repeating said steps of identifying an additional set of live methods and procedures and of identifying an additional set of live classes until no further methods or procedures are added to said set of live methods and procedures; and removing methods and procedures not identified as live.

* * * * *